(12) United States Patent
Chung et al.

(10) Patent No.: US 7,073,428 B2
(45) Date of Patent: Jul. 11, 2006

(54) AUTOMATIC TEA MAKER

(76) Inventors: Ming-Chi Chung, P.O. Box No. 6-57, Junghe, Taipei 235 (TW); Chin-Jen Lin, P.O. Box No. 6-57, Junghe, Taipei 235 (TW)

( * ) Notice: Subject to any disclaimer, the term of this patent is extended or adjusted under 35 U.S.C. 154(b) by 0 days.

(21) Appl. No.: 11/211,428

(22) Filed: Aug. 26, 2005

(65) Prior Publication Data

US 2006/0102009 A1     May 18, 2006

(30) Foreign Application Priority Data

Nov. 15, 2004   (TW) .............................. 93218207 U (51) Int. Cl.
*A47J 31/00*     (2006.01)

(52) U.S. Cl. ..................... 99/283; 99/285; 99/299; 99/306; 99/323.3

(58) Field of Classification Search .......... 99/179–283, 99/285–306, 495, 316–319, 323, 323.3; 210/474–479, 210/238, 181; 426/433, 435
See application file for complete search history.

(56) References Cited

U.S. PATENT DOCUMENTS

| | | | | |
|---|---|---|---|---|
| 2,021,293 A | * | 11/1935 | De Silva | 99/299 |
| 5,632,193 A | * | 5/1997 | Shen | 99/285 |
| 5,632,194 A | * | 5/1997 | Lin | 99/285 |
| 5,725,765 A | * | 3/1998 | Shen | 210/238 |
| 5,826,493 A | * | 10/1998 | Tien Lin | 99/306 |
| 5,855,160 A | * | 1/1999 | Shen | 99/279 |
| 5,862,739 A | * | 1/1999 | Lin | 99/285 |
| 6,058,827 A | * | 5/2000 | Lin Tien | 99/299 |
| 6,164,190 A | * | 12/2000 | Tien Lin | 99/299 |
| 6,481,337 B1 | * | 11/2002 | Guu | 99/285 |
| 6,742,442 B1 | * | 6/2004 | Su | 99/281 |
| 6,786,137 B1 | * | 9/2004 | Shen | 99/323 |
| 6,810,789 B1 | * | 11/2004 | Chung et al. | 99/299 |

* cited by examiner

*Primary Examiner*—Timothy F. Simone (57) ABSTRACT

An automatic tea maker comprises a cover body, a tube base, and a bottom base, wherein the cover body is covered on the tube base, which is eccentrically disposed on the bottom base. A partition is disposed on an interior of the tube base to partition an independent drainage area. A vent disposed on the partition communicates with the tube base. Each of water exits, provided with a stopping members, are disposed on a base surface of the tube base. A baffle extends from an internal periphery of the bottom base with push rods placed on the baffle protruding outward from the water exits. The push rods placed on the baffle extend corresponding to the stopping members of the water exits, is able to push the stopping members away from the water exits, when the tube base is slanted corresponding to the bottom base.

6 Claims, 8 Drawing Sheets

AUTOMATIC TEA MAKER

BACKGROUND OF THE INVENTION (a) Field of the Invention

The present invention relates to an automatic tea maker, more particularly, to an automatic tea maker that is capable of automatically pouring tea therefrom, within prescribed tea-brewing time.

(b) Description of the Prior Art

In addition to the quality of tea leaves, tea-brewing time, the temperature of hot water and the quality of water are also important factors affecting the quality of tea leaves brewing. Among these factors, tea-brewing time is the most important. Therefore, it is necessary to control the tea-brewing time very accurately, because overly short tea brewing time will be unable to express the taste of tea leaves, whereas overly long tea brewing time will make the tea leaves bitter and the flavor of tea not good.

The majority of the structures of general tea makers are designed to have tea leaves placed at the lowest layer of the teapot. Then, tea leaves are filtered and separated through a filter net, so tea can separately flow out. However, if this tea-brewing structure is used to brew tea leaves, the user is required to control the tea-brewing time on his/her own. If the tea-brewing time is forgotten or not properly controlled, the flavor of tea leaves is tremendously affected.

SUMMARY OF THE INVENTION

It is the primary object of the present invention to provide an automatic tea maker structure that is capable of automatically pouring tea therefrom, within prescribed brewing time.

To achieve the above object of the present invention, the automatic tea maker disclosed in the present invention comprises a cover body, a tube base, and a bottom base. The cover body is disposed on a top rim of the tube base thereof. The tube base includes two pivots eccentrically disposed on an exterior thereof. A partition is disposed on an interior of the tube base to partition an independent drainage area. Next, a vent is disposed on the partition to make the drainage area communicate with the interior of the tube base. Then an adjustable structure is disposed corresponding to the vent to control the size of the vent. Next, water exits, each of which disposes a stopping member, are disposed on a base surface of the tube base respectively. The bottom base is configured corresponding to the tube base. A concave is formed on a top edge of the bottom base corresponding to a pivot of the tube base. Then a prop edge is slanted and formed on the water exits of the tube base corresponding to the top edge of the bottom base. Next, a baffle extends from an internal periphery of the prop edge. Then a push rod placed on the baffle protrudingly extends corresponding to the water exits of the tube base.

Therefore, the pivot of the tube base props up corresponding to the concave of the bottom base to perform as a rotary fulcrum. This way, when water is poured into the tube base filled with tea leaves therein, tea can flow into the drainage area through the adjusted vent on the partition inside the tube base, of which weight is centered on another half side of the drainage area and the vent. Then the pivot on the bottom of the tube base is rotated and slanted toward the bottom base. Therefore, water exits on a surface of the tube base are pushed to the top by the corresponding push rods and then discharged. Finally, tea inside the tube base automatically flows to the interior of the bottom base and accumulates therein, within prescribed brewing period.

To enable a further understanding of the objectives and the technological methods of the invention herein, the brief description of the drawings below is followed by the detailed description of the preferred embodiments.

DETAILED DESCRIPTION OF THE PREFERRED EMBODIMENTS

Figure 1:
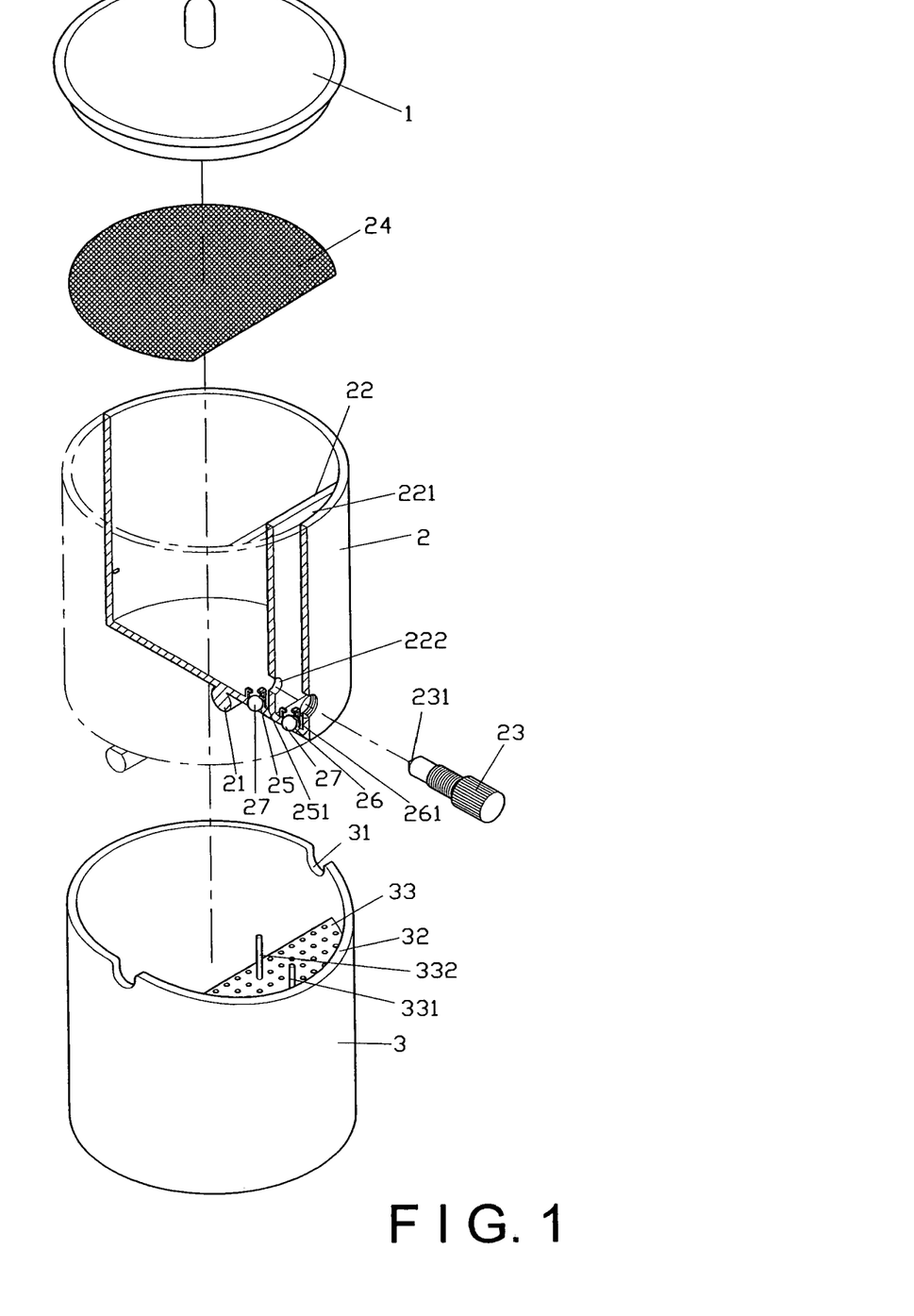
FIG. 1 shows a perspective exploded view of the present invention.
Figure 2:
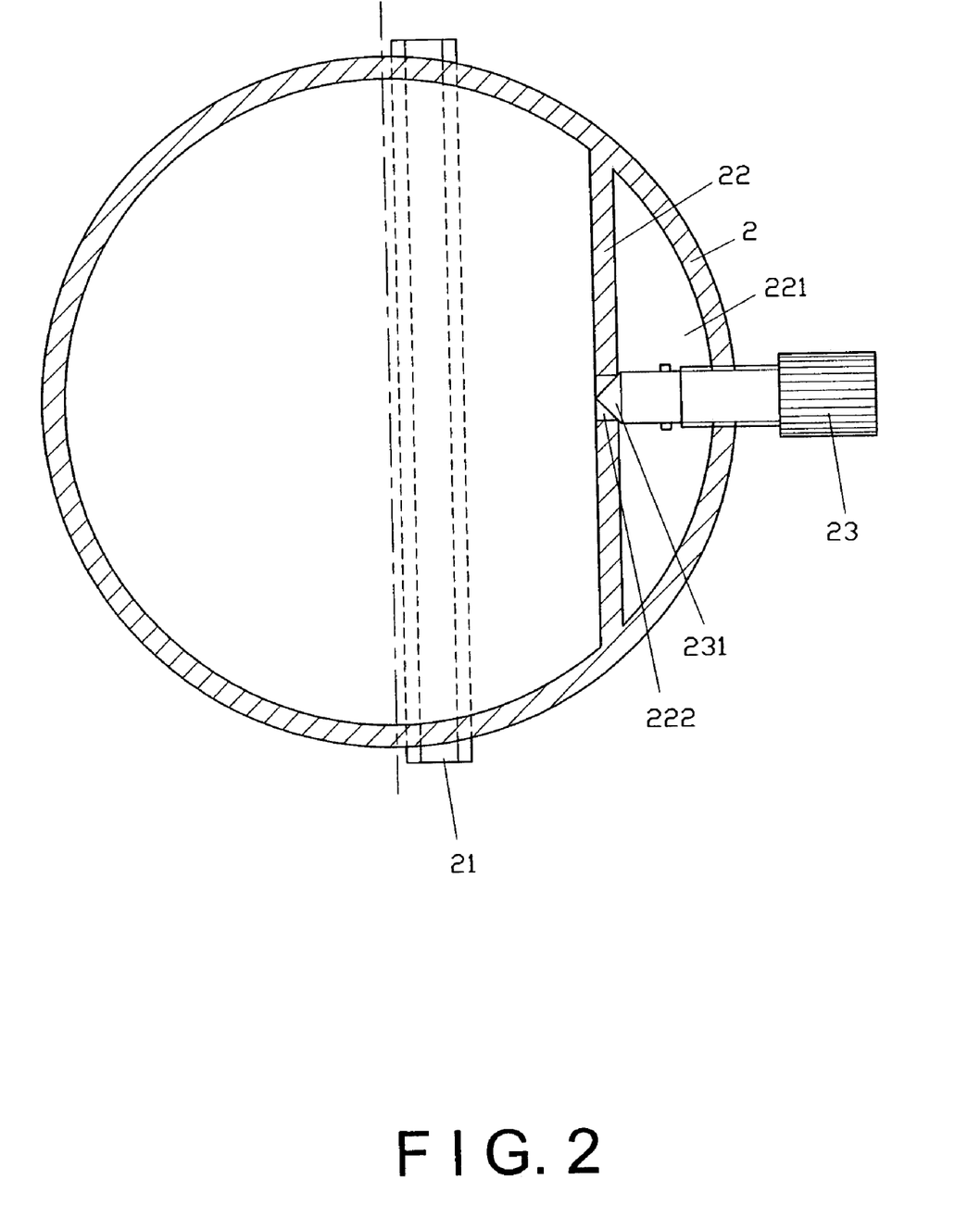
FIG. 2 shows a top elevational, assembly view of the present invention.

Referring to FIGS. 1 & 2, the present invention comprises a cover body (1), a tube base (2), and a bottom base (3). The cover body (1) is covered on a top rim of the tube base (2). The tube base (2) includes two pivots (21) eccentrically disposed on an exterior thereof. A partition (22) formed with a vent (222) is then disposed on one side of an internal periphery of the tube base (2), so as to partition an independent drainage area (221). An adjustable structure (23) provided in this embodiment is an adjustable rod, which is disposed corresponding to the vent (222). One end of the adjustable rod having a gradually contracted section (231) extends corresponding to the diameter of the vent (222) and further extends into the vent (222), while another end of the adjustable rod extends out of the tube base (2). Afterwards, a filter net (24) is disposed at a suitable distance from an upper portion of a surface inside the tube base (2). Water exits (25) and (26) are formed inside the tube base (2) next to a base surface of the drainage area (221), and a base surface of the drainage area (221) respectively. Afterwards, spherical stopping members (27) are disposed inside the water exits (25) and (26) respectively. Stopping rods (251) and (261) then extend perpendicular to an edge of water exits (25) and (26), so as to define the stopping members in position (27);

The bottom base (3) is molded and configured corresponding to the tube base (2). A concave (31) is formed on a top edge of the bottom base (3) corresponding to a pivot (21) of the tube base (2). Afterwards, a prop edge (32) is slanted and formed along with the concave (31). A baffle (33) is formed within an internal periphery of the prop edge (32). Then push rods (331) and (332) protrudingly extend from the baffle (33) corresponding to the water exits (25) and (26) formed on a base surface of the tube base (2).

Figure 3:
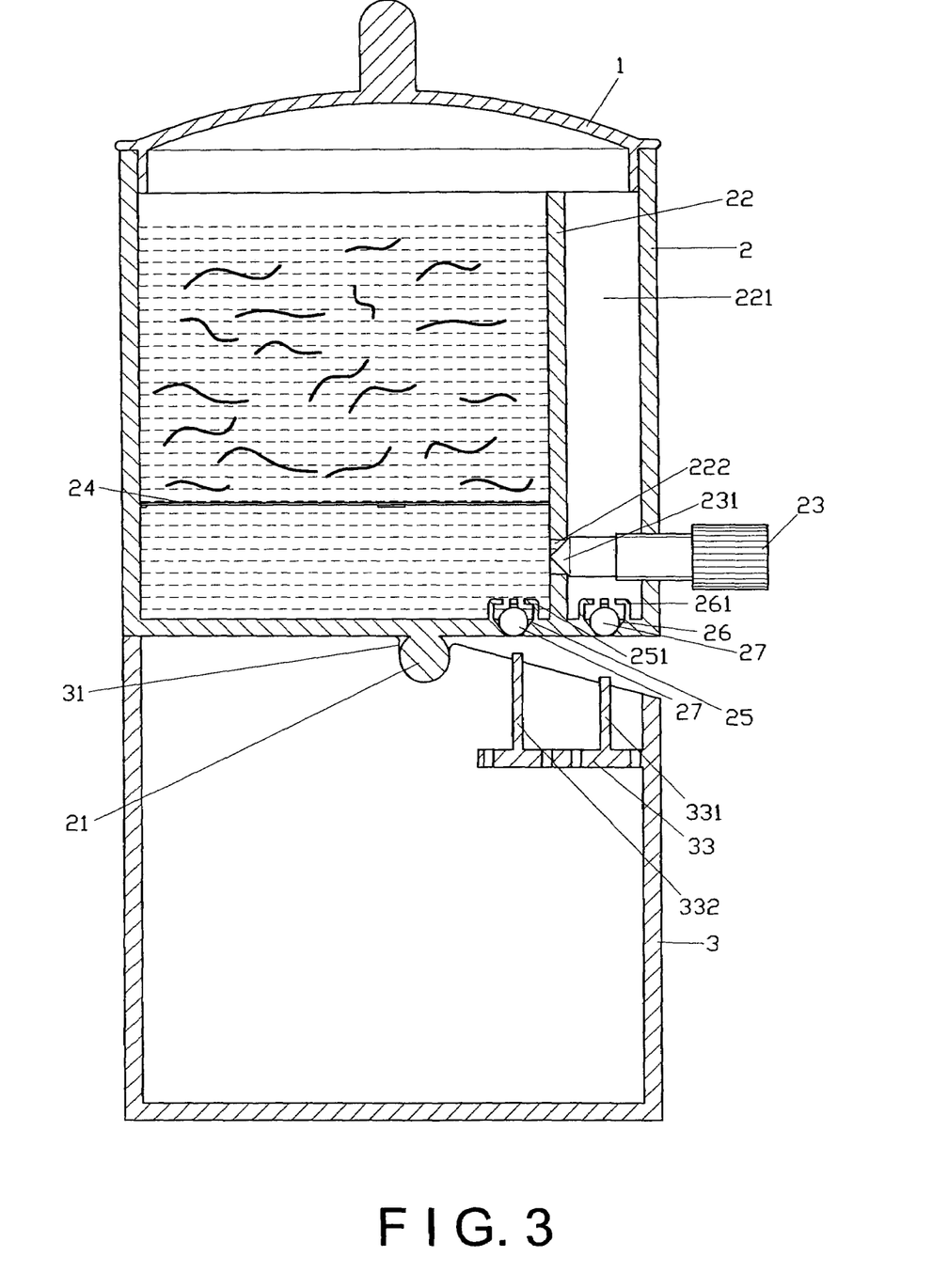
FIG. 3 shows a cross-sectional view of a first embodiment of the present invention.

During assembling, as shown in FIG. 3, the cover body (1) is covered on a top rim of the tube base (2). The pivot (21) of the tube base (2) props against the concave (31) of the bottom base (3), thereby performing as a rotary fulcrum. The water exits (25) and (26) formed on the surface of the tube base (2) are positioned on an upper part of the baffle (33) on the bottom base (3). The push rods (331) and (332) formed on the baffle (33) of the bottom base (3) extend corresponding to the stopping members (27) placed on the water exits (25) and (26). The stopping members (27) are maintained in position against the water exits (25) and (26) due to the weight. This way, the liquid does not flow out from the water exits (25) and (26), under normal conditions.

Figure 4:
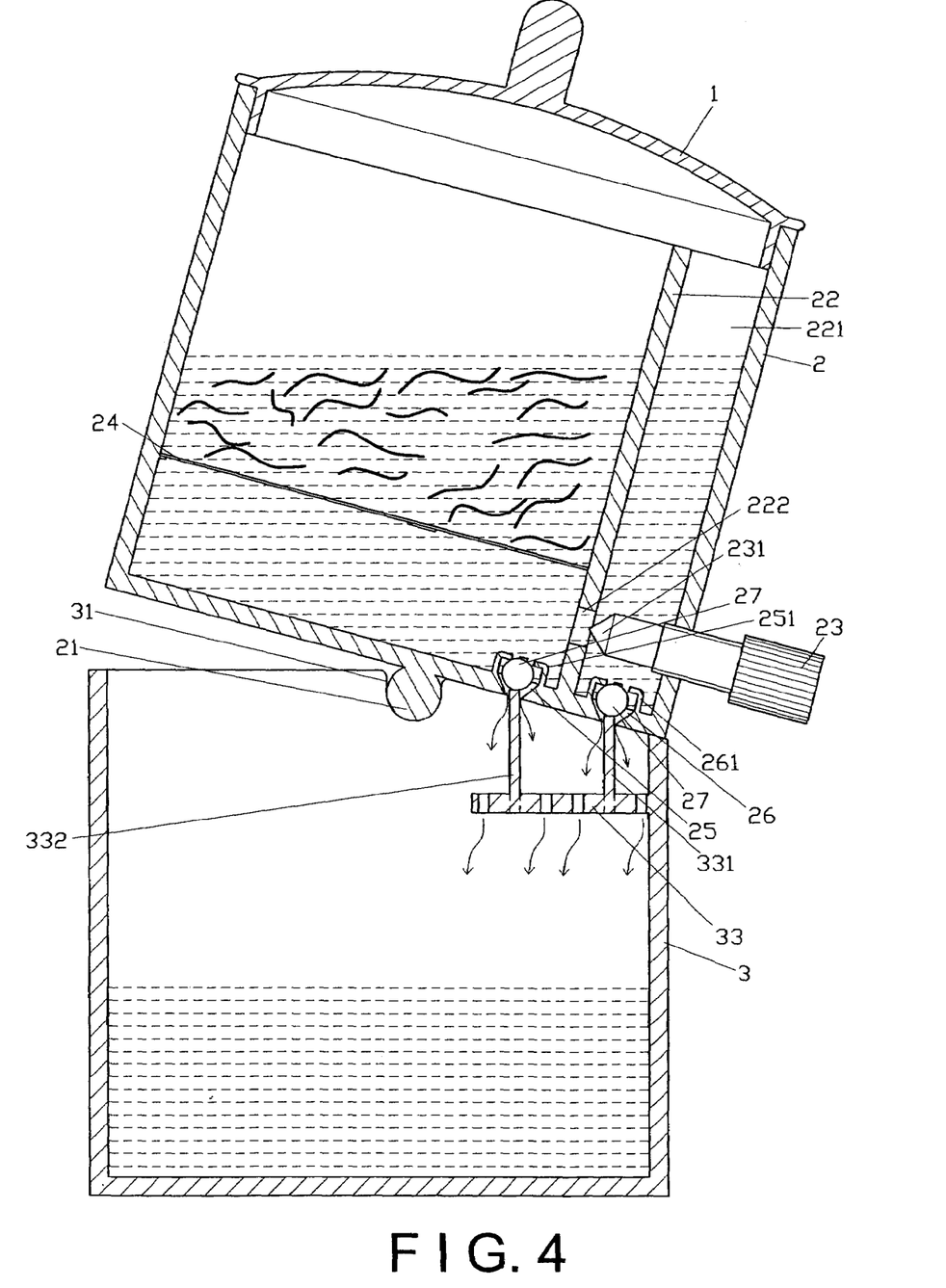
FIG. 4 shows a cross-sectional view with schematic movement of a first embodiment of the present invention.

Hence, tea leaves are placed on the filter net (24) inside the tube base (2). When hot water is poured into the tube base (2), hot water accumulates on a farther half side of the pivot (21), because the pivot (21) of the tube base (2) is eccentrically disposed thereon. Referring to FIG. 4, when the adjustable structure (23) is adjusted, a clearance is formed between the gradually contracted section (231) at an end of the adjustable rod and the vent (222), such that hot water inside the tube base (2) can flow to the drainage area (221) from the clearance. Hence, the weight of the liquid inside the tube base (2) is gradually centered on another half side of the tube base (2) with the drainage area (221). Therefore, the tube base (2) is slanted with the pivot taken as the pivotal center thereof. This way, the bottom of the tube base (2) directly props against the prop edge (32) on the bottom base (3). As push rods (331) and (332) are disposed on the baffle (33) of the bottom base (3), and when the tube base (2) is slanted and props against the prop edge (32) of the bottom base (3), the push rods (331) and (332) placed on the bottom base (3) can directly prop against the corresponding stopping members (27) inside the water exits (25) and (26), thereby discharging the stopping members (27) from the water exits (25) and (26), enabling tea inside the tube base (2) can flow into the bottom base (3) through the water exits (25) and (26). As tea leaves are placed on the filter net (24), tea can be directly separated from tea leaves, such that the tea inside the bottom base (3) is filtered, with no tea leaves left behind therein.

Besides, the present invention can adjust the tea-brewing time, depending on the type of tea leaves to be brewed, and is primarily provided to adjust the adjustable rod (231) extended inside the vent (222). By adjusting the distance extended by the gradually contracted section (231) of the adjustable rod into the vent (222), the clearance formed between the vent (222) and the gradually contracted section (231) of the adjustable rod is thus adjusted, so as to control the flow rate of the fluid into the drainage area (221). This way, when the fluid rapidly flows into the drainage area (221), the tube base (2) is made to become slanted earlier. Hence, the push rod (331) formed on the baffle (33) of the bottom base (3) can push the stopping members (27) on the water exits (25) and (26) away from the water exits (25) and (26). As a result, the liquid can be raised, and then flows into the bottom base (3). Therefore, this greatly shortens the stay time of the liquid inside the tube base (2). In addition, this can also shorten the brewing time of tea leaves. Furthermore, time gradations can be made on the adjustable rod for adjustment.

Figure 5:
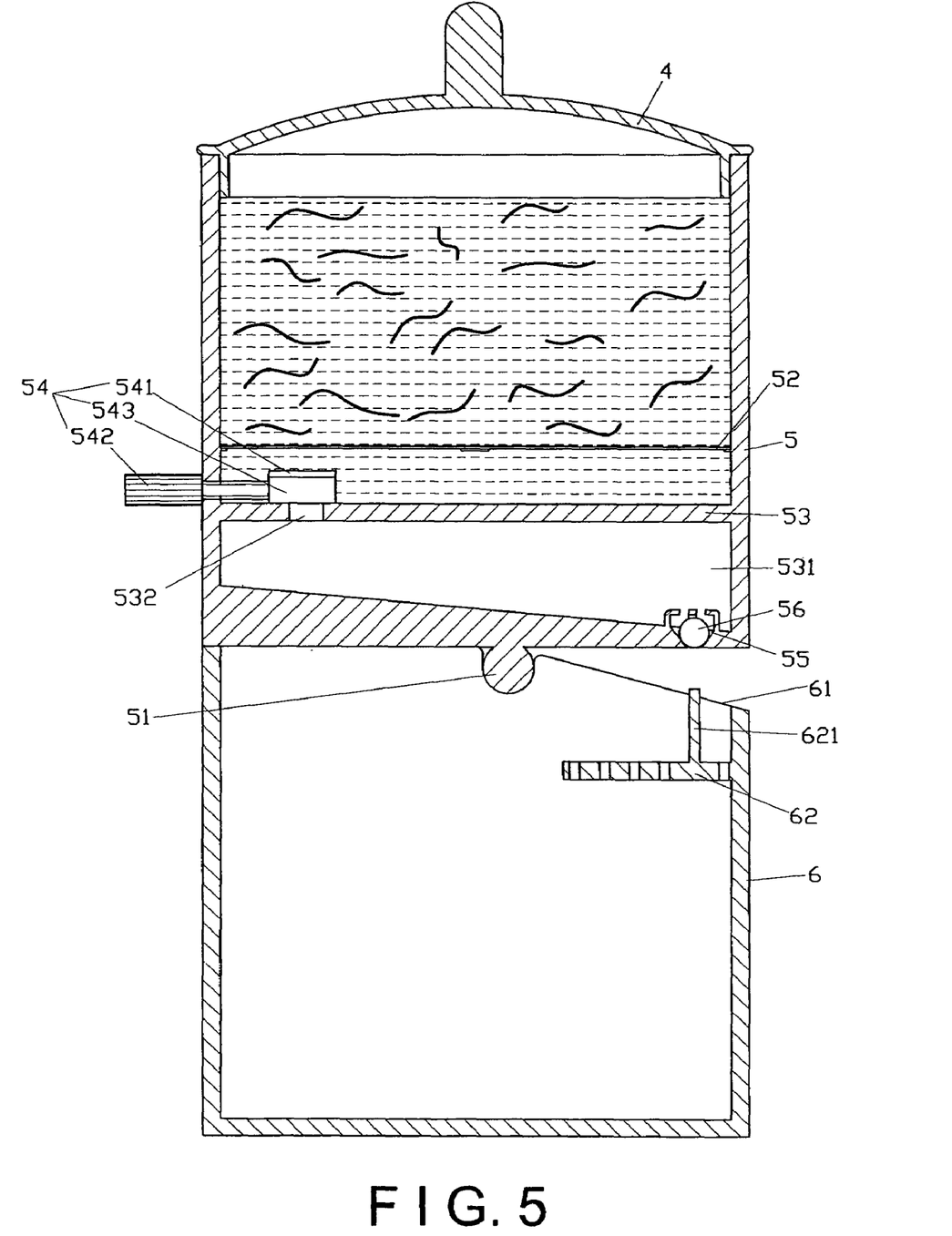
FIG. 5 shows a cross-sectional, assembly view of a second embodiment of the present invention.
Figure 6:
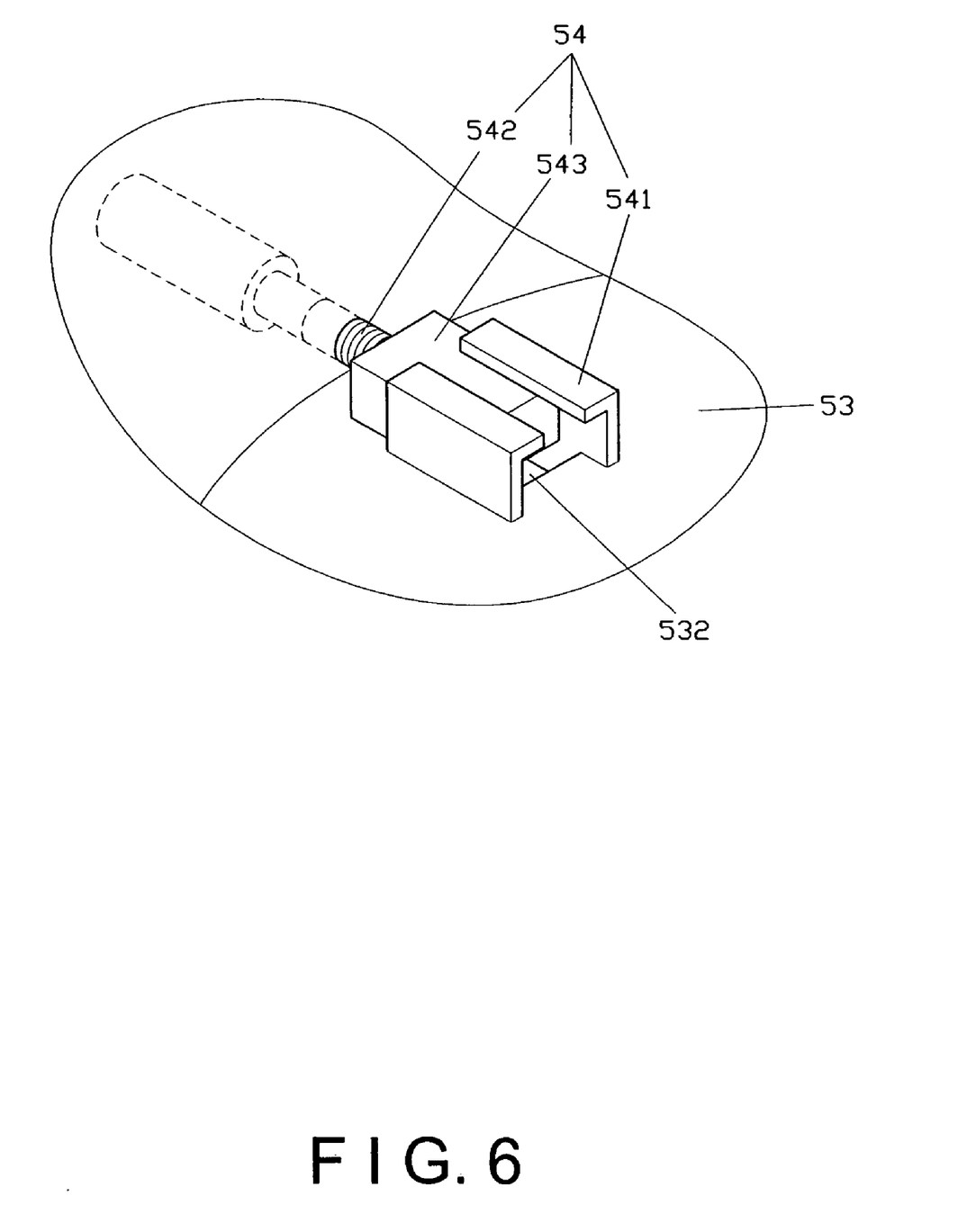
FIG. 6 shows a schematic view of the adjustable structure in a second embodiment of the present invention.

To achieve the effects of automatic brewing, according to FIG. 5, the embodiment of the present invention also comprises a cover body (4), a tube base (5), and a bottom base (6), and primarily consists of two pivots (51) extending from an external periphery of the tube base (5) respectively. A filter net (52) and a partition (53) are sequentially disposed inside the tube, and the partition (53) is provided with a vent (532) forming a drainage area (531) along with an internal base partition of the tube base (5). An adjustable structure (54) provided in the embodiment as shown in FIG. 6 is disposed corresponding to the vent (532) and comprises a track (541), an adjustable rod (542), and a stopping block (543). The track (541) is disposed on the partition (53) corresponding to the two sides of the vent (532). Afterwards, the stopping block (543) actuated by the adjustable rod (542) is disposed inside the track (541). Under normal conditions, the stopping block (543) props against an upper part of the vent (532), so the vent (532) becomes closely sealed.

Moreover, the internal surface of the tube base (5) is a surface slanting gradually from the top to the bottom, such that the drainage area (531) also becomes slanted along with the surface thereof. At least one set of water exits (55) is formed at the minimum location of the slanted surface. Then, a stopping member (56) is disposed in each set of water exits (55), thereby propping up against the water exits (55), under normal conditions.

Furthermore, a prop edge (61) is disposed on an external periphery of the edge of the bottom base (6); a baffle (62) is disposed on the internal periphery thereof, corresponding to the water exits (55) of the tube base (5). Afterwards, at least one push rod (621) is disposed on the baffle (62) corresponding to the water exits (55).

During the assembly and installation of the embodiment, the adjustable rod (542) formed in the adjustable structure (54) is first adjusted, thereby linking to the stopping block (543), and discharging along the track (541) corresponding to the vent (532). On the other hand, the liquid inside the tube base (5) can gradually flow into the drainage area (531) at the bottom of the partition (53) formed on the tube base (5). This way, liquid can flow to the lowest portion and then accumulate therein, along the slanted surface on an internal base surface of the drainage area (531), thereby making that location gradually heavier in weight. Then the pivot (51) at an external periphery of the tube base (5) is taken as the center, and then slanted toward the prop edge (61) on the top of the bottom base (6). This way, the water exits (55) on the surface of the tube base (5) prop up against the push rod (621) of the baffle (62) formed on the bottom base (6). Hence, the stopping member (56) in the water exits (55) can be discharged. As a result, tea can flow from the water exits (55) into the bottom base (6).

Figure 7:
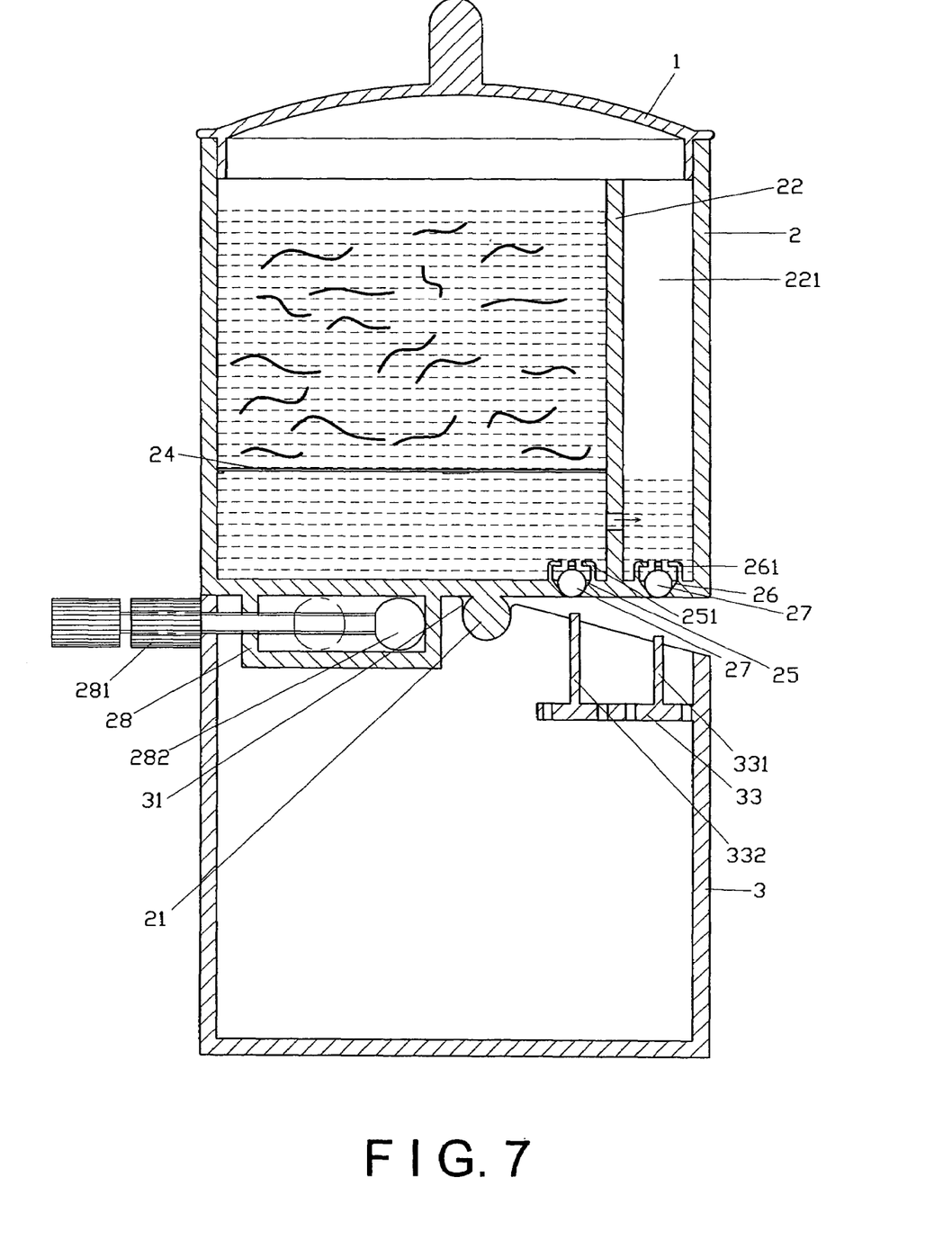
FIG. 7 shows a cross-sectional, assembly view of a third embodiment of the present invention.

Besides, according to FIG. 7, as the present invention is primarily derived from the first embodiment, the numbers of the element in the drawing still follow those of the first embodiment, except for different elements as illustrated. The embodiment comprises a cover body (1), a tube base (2), and a bottom base (3), wherein the tube base (2) is a drainage area (221) independently partitioned by a partition (22), and, a vent (222) is formed on the partition (22). A pivot (21) is eccentrically disposed on the tube base (2) corresponding to the surface of the bottom base (3). An interval (28) is disposed at close proximity to the pivot (21), and then, a counter weight block (282) that is joined to a screw (281) is disposed inside the interval (28). Hence, by adjusting the screw (281) therein, the counter weight block (282) is then actuated to move inside the interval (28).

Figure 8:
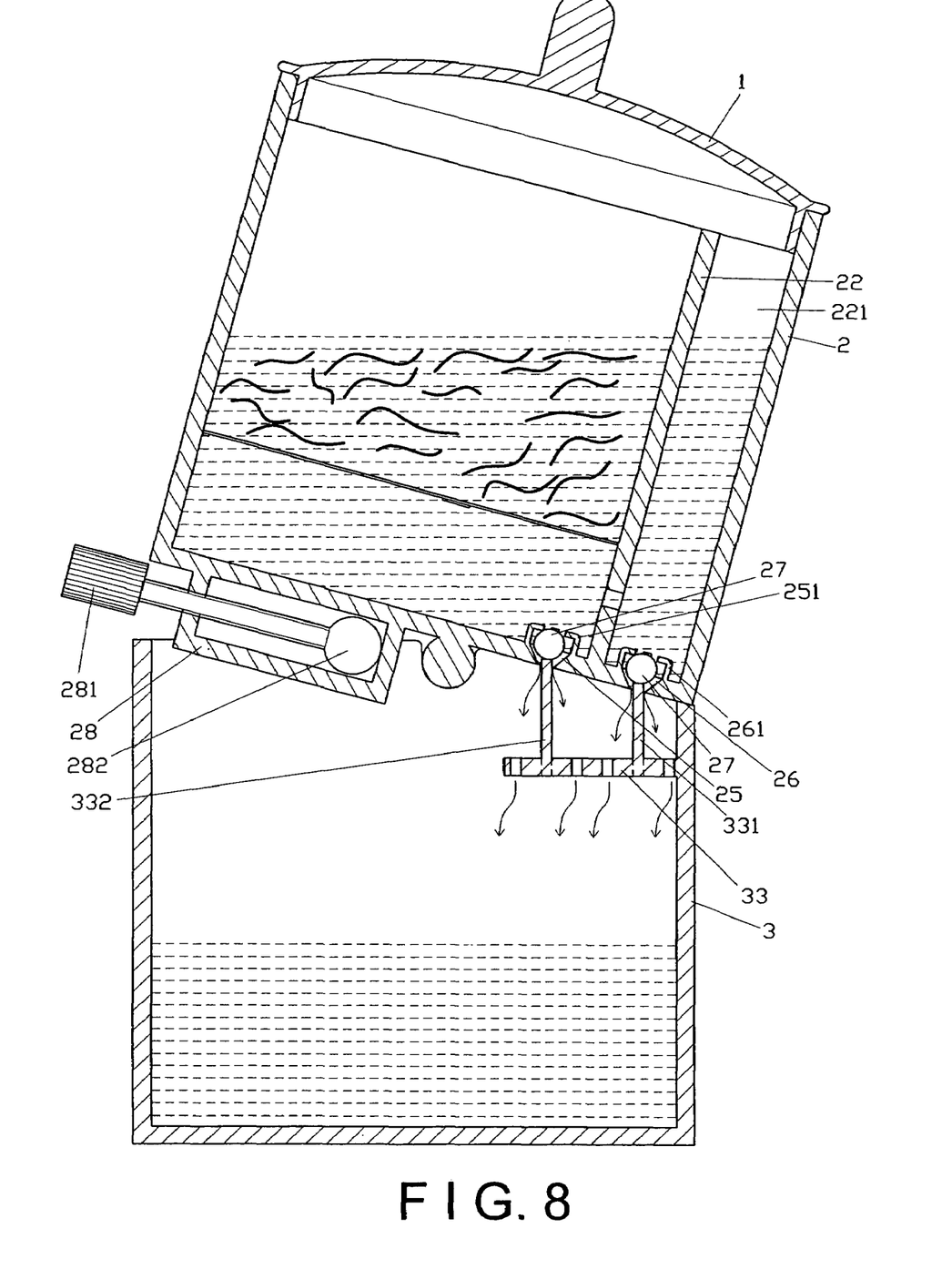
FIG. 8 shows a cross-sectional view with schematic movement of a second embodiment of the present invention.

When adjusting the tea-brewing time, the screw (281) therein can be rotated to actuate the movement of the counter weight block (282) inside the interval (28), to control the distance between the counter weight block (282) and the pivot (21), and also control the slanting speed of the tube base (2) corresponding to the bottom base (3). If it is intended to shorten the tea-brewing time, as shown in FIG. 8, the counter weight block (282) can be adjusted to make it stick close to the pivot (21). Then, the weight will be centered on the half side of the tube base (2) comprising the drainage area (221), thereby making the tube base (2) slant within a shorter time period. This way, tea can be poured out.

On the contrary, if the tea-brewing time is longer, the counter weight block (282) can be adjusted to a farther location of the pivot (21), so as to indirectly control the length of tea brewing time.

Overall, the structure of the automatic tea maker provided in the present invention is capable of automatically pouring tea therein, within prescribed tea brewing time. Therefore, it is not necessary for the user to control the tea-brewing time on his/her own. This way, the tea leaves can be made to brew at an ideal tea-brewing time. Hence, the structure disclosed in the present invention is deemed different from the conventional design.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. An automatic tea maker comprising a cover body, a tube base, and a bottom base, wherein:
   the cover body, molded and configured corresponding to the tube base, and disposed on a top rim of the tube base;
   the tube base, which includes two pivots eccentrically disposed on an exterior thereof; a partition is then disposed on one side of an interior of the tube base, so as to partition an independent drainage area;
   a vent is disposed on the partition, to make the drainage area communicate with the interior of the tube base; an adjustable structure is disposed corresponding to the vent, to control the opening and closing of the vent; water exits are disposed on a base surface of the tube base respectively; a stopping member is disposed inside each of the water exits;
   the bottom base, which is molded and configured corresponding to the tube base; a concave is formed on a top edge of the bottom base corresponding to a pivot of the tube base; moreover, a prop edge is slanted and formed on the top edge of the bottom base corresponding to the water exits of the tube base, and then, a baffle extends from an internal periphery of the prop edge; a push rod protrudingly extends from the baffle corresponding to the water exits of the tube base; and
   the pivot of the tube base props against the concave of the bottom base, thereby performing as a rotary fulcrum; the water exits on the surface of the tube base are positioned on an upper part of the baffle on the bottom base; the push rods formed on the baffle extend corresponding to the stopping members placed on the water exits, thereby pushing the stopping members away from the corresponding water exits, when the tube base is slanted corresponding to the bottom base.

2. The automatic tea maker as claimed in claim 1, wherein a filter net is disposed in the interior of the tube base.

3. The automatic tea maker as claimed in claim 1, wherein the drainage area is disposed on an internal periphery at one side of the tube base.

4. The automatic tea maker as claimed in claim 1, wherein the drainage area is disposed on an upper part of an internal base surface of the tube base.

5. The automatic tea maker as claimed in claim 1, wherein a gradually slanted surface is formed from the top to the bottom, and on the internal surface inside the tube base; water exits are then disposed at the minimum locations of the slanted surface.

6. An automatic tea maker, comprising a cover body, a tube base, and a bottom base, wherein,
   the cover body, molded and configured corresponding to the tube base, and disposed on a top rim of the tube base;
   the tube base, which includes two pivots eccentrically disposed on an exterior thereof; a partition is disposed on an interior of the tube base, to partition an independent drainage area; a vent is disposed on the partition, to make the drainage area communicate with the interior of the tube base; an independent interval and a water exit comprising a stopping member are disposed on a base surface of the tube base corresponding to the bottom base; a screw comprising a counter weight block is disposed inside the interval;
   the bottom base, which is molded and configured corresponding to the tube base; a concave is formed on a top edge of the bottom base corresponding to a pivot of the tube base; a prop edge is slanted and formed at the water exits of the tube base corresponding to the top edge of the bottom base; a baffle extends from an internal periphery of the prop edge; a push rod protrudingly extends from the baffle corresponding to the water exits of the tube base; and
   the pivot of the tube base pivotally props against the concave of the bottom base, and then, water exits on the tube base are suitably positioned on an upper part of the baffle on the bottom base;
   afterwards, the push rods formed on the baffle extend corresponding to the stopping members placed on the water exits; the location of the counter weight block inside the interval is adjusted by means of a screw therein, to control the slanting speed of the tube base corresponding to the bottom base; the push rod on the baffle pushes the stopping member away from the water exits, when the tube base is slanted corresponding to the bottom base.

* * * * *